United States Patent
Prunchak

[11] 3,708,924
[45] Jan. 9, 1973

[54] WINDSHIELD BLADE RECONDITIONER

[76] Inventor: John Prunchak, 1013 Wymore Street, Pittsburgh, Pa. 15220

[22] Filed: March 22, 1971

[21] Appl. No.: 126,849

[52] U.S. Cl.....................................51/205 R, 51/392
[51] Int. Cl.........B24d 5/00, B24d 7/00, B24d 15/00
[58] Field of Search....................51/205 R, 391-393, 51/281, 328

[56] References Cited

UNITED STATES PATENTS 1,173,549   2/1916   Blair........................................51/392
3,114,352   12/1963  Mathisen............................51/391 X

*Primary Examiner*—Othell M. Simpson
*Attorney*—Green, McCallister & Miller

[57] ABSTRACT

A hand tool of pocket size is provided for cleaning and reconditioning the wiping edge portion of a resin or rubberlike wiping blade for windows, such as of a motor vehicle. The tool has a rigid operating head of abrasive-lined surface V-shape that is adapted to be moved along the wiping edge portion of a blade to remove adherent road grime, alkali metal scum, etc. The construction is such that highly adherent soaplike materials are removed with an abrasive-scraping relative movement of the operating head along the feather wiping edge and adjacent side portions or faces of the wiping edge portion of the blade; the sides of the head have an angular relation such as to support the blade in a relatively straight or unbent or folded-over shape during the cleaning movement of the tool longitudinally therealong. The tool has a gripping handle that is angled from the operating head to enable the operator to easily condition or clean a wiper blade that is in position in a substantially planar operating position with respect to the windshield of a vehicle by merely raising the blade slightly away from the windshield.

10 Claims, 6 Drawing Figures

PATENTED JAN 9 1973  3,708,924

INVENTOR.
John Prunchak
BY Green, McCallister & Miller
HIS ATTORNEYS

WINDSHIELD BLADE RECONDITIONER

BACKGROUND OF THE INVENTION

Field of the Invention

This invention relates to a tool or hand-operated device for cleaning-scraping or reconditioning rubberlike wiper blades such as are used on a motor vehicle for cleaning its windshield, and particularly to a tool that will operate to quickly and effectively remove highly adherent sludge, scum, slime, road oil, etc., in order that the blade may be restored to a full cleaning effectiveness and without replacement. A phase of the invention deals with providing a tool that will clean and recondition a wiper blade by shape-supporting movement along its immediate wiping edge portion and without damage to the blade and in such a manner as to remove any adherent coating material including corrosive salt film therefrom.

SUMMARY OF THE INVENTION

During the different seasons of the year, a windshield wiper blade is subjected to wear and tear, due not only to the need for removing raindrops, snow, and ice but also due particularly to the presence of road sludge, scum, slime and salts, such as used for melting ice and snow in freezing weather. Such materials tend to not only form a vision obscuring scum on a glass windshield, but also tend to form a slippery greaselike, substantially invisible coating on the wiper blade which, in a short time, makes it ineffective in cleaning and tends to streak the windshield. The filling station attendant will lift the wiper blades and clean the windshield but merely lets the blades snap back in place thereafter, not realizing that an invisible coating is being built-up on the blade making it less effective. When sufficient thickness of the coating builds up, then it has been customary to replace the wiper blade which is an expensive item.

The applicant discovered that although those skilled in the art had heretofore thought that the blade had deteriorated from the standpoint of its rubber content when its initial operative efficiency was reduced, the formation of an adherent film is the real reason and this is true, although a failure to remove such film particularly where corrosive salt has been used will result in a deterioration of flexible characteristics of the blade. The real difficulty involved is the formation or gradual building up of a coating or film on the active wiping edge surface of and along adjacent operating surfaces of the blade. Thus, steps were taken in an endeavor to find some means of removing such film periodically without damage to the relatively thin, supple, somewhat featherlike working edge portion of the blade.

It has been discovered that this could be accomplished by employing a V-shaped slide body or head having an applied, relatively fine, sander or abrasive backing surface, or lining and as supported by an angularly positioned backwardly sweeping handle for longitudinal movement along the blade. The abrasive surface or lining is adapted to both abut the immediate wiping edge and abutment-support the blade along its opposed side faces to maintain its shape adjacent such edge. Although one full longitudinal stroke along the upper blade is usually sufficient, a back and forth stroke may be accomplished for a badly coated blade, all without removing the blade from its mounted position on the vehicle and while holding it with one hand slightly outwardly on its flexible mounting away from the windshield and employing the other hand to grip and operate the tool. The head and handle of the tool are constructed to assure a proper relative cleaning action from the side of the hood of a vehicle without effecting a tearing action on the rather fragile immediate feather or wiping edge of the blade. Surprisingly as it may seem, it has been discovered that a cleaning stroke of the tool periodically will give a wiper blade an indefinite effective operating life, in that it both removes substances which decrease its efficiency as well as those that tend to deteriorate the rubberlike material of its construction.

It has thus been an object of the invention to solve the problem of rapid windshield wiper blade deterioration.

Another object has been to provide simple and effective means for reconditioning the wiping portion of a wiper blade without in any way damaging it and in such a manner as to materially increase its operating life effectiveness.

A further object has been to provide a tool that can be held in a comfortable position by the user thereof and quickly and effectively utilized to recondition a wiping blade whenever it becomes necessary.

These and other objects will appear to those skilled in the art from the illustrated embodiment.

Figure 5:
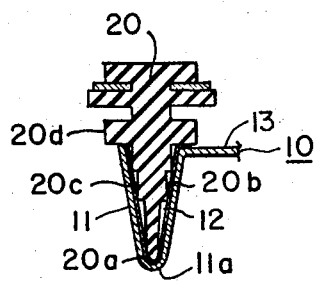
FIG. 5 is an enlarged end section in elevation showing a representative positioning of a wiper blade within the operating head of the tool during the cleaning of the blade and importantly, in such a manner as to prevent a bending-under of the wiping edge or of adjacent opposed side faces of the blade.
Figure 6:
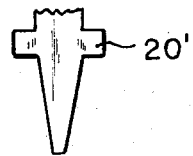

And, FIG. 6 is a fragmental end view in elevation on the scale of FIG. 5 showing a modified type of wiper blade such as used on a jeep and which may be reconditioned or cleaned in accordance with the invention.

DESCRIPTION OF THE PREFERRED EMBODIMENT

In carrying out the invention, a tool or device 10 has been devised that has a rigid V-shaped operating body or head part 11 that defines an operating trough, groove or recess portion to be drawn along the wiping portion of a typical wiper blade, see 20 or 20' of FIGS. 5 and 6. The operating head 11 is defined by a pair of outwardly diverging and inwardly converging side walls that meet at a connecting rounded or smoothly angular base or apex portion 11a. Both the inside of the apex portion 11a and the inner planar faces of the side walls are shown covered with an abrasive material or strip 12 which may be a pressure-sensitive adhesive on one side with a grit or sanding surface on its opposite side. It may have an aluminum oxide grit on its exposed or operating side. A suitable material of this nature is being produced and sold by Carborundum Corporation of America as its Flexbac cloth and can be obtained within a relatively fine range of grit that is required for providing an abrasive surface that is effective for the cleaning action without damage to the wiper blade. In this connection, too fine a grit will not properly remove the film or coating, while too heavy a grit will tend to roughen the surface of the blade and, in this sense, open its pores and make it more sensitive to sludge and grime pick-up. It is thus important to employ a grit within a range of about 100 to 500, with an optimum of about 350 to 400.

Aluminum oxide grit has been found to be particularly suitable, although silicon carbide and other grits may be employed. A cloth strip or fabric like abrasive material as well as a tough paper backing have been found to be satisfactory. It is important to use a waterproof, weather-resistant adhesive, such as an epoxy resin, for securing the material 12 within the head 11. The shape of the groove portion is such as to further the maintenance of the abrasive material 12 in an adherent relation within the operating head 11, and to properly support or position the wiper blade 20 for effecting an efficient cleaning operation and without damaging the blade 20. It is also important to have the material 12 fully planar with the downwardly converging planar sides of the groove and in a secure angular relation at the outwardly offset connecting base or apex portion 11a thereof. An effective angular relation for each inwardly converging side wall of the head of about 15° to a minimum of about 9° with respect to the vertical has been found to be suitable, with an optimum of about 10°. The angle should be such that the lower, feather edge portion of the blade is supported in substantially a straight plane and its immediate edge is in pressure-engagement with the apex portion 11a.

It is also important to provide the tool 10 with a handle part 13 that extends in a somewhat angular, off-normal or perpendicular, backward sweep from the operating head 11, in order that the operator can have a free and easy sweep in moving or pulling the tool along the blade substantially normal or perpendicular thereto from the side of a hood of a motor vehicle. The tool 10 may be of a suitable metal material, such as aluminum steel or stainless steel, but it should provide an operating head part 11 of rigid nature, although the handle 13 may be somewhat flexible. As shown, the handle 13 has a pair of planar wide side faces that extend substantially perpendicular with respect to the V portion of the head 11. If the tool is made of a resin (plastic) material it should be of a reinforced type to provide the necessary strength for the handle 13 with rigidity of the head 11. A bore hole or eyelet 13a is shown provided near the extending rounded end portion of the handle 13 to enable it to be carried on a key chain or to be carried on a hook, ready for use as needed.

Figure 1:
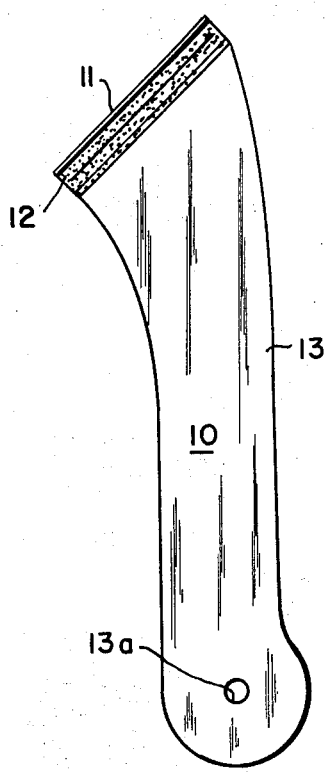
FIG. 1 is a plan view to scale taken from the underside of a tool or device constructed in accordance with the invention.
Figure 2:
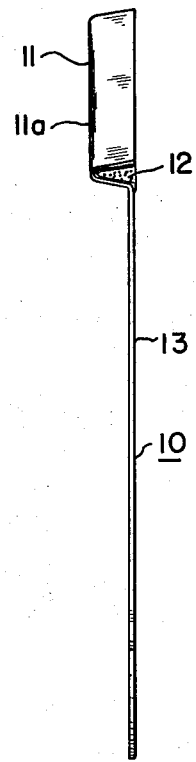
FIG. 2 is a front edge view in elevation on the same scale of and of the tool or device of FIG. 1.
Figure 3:
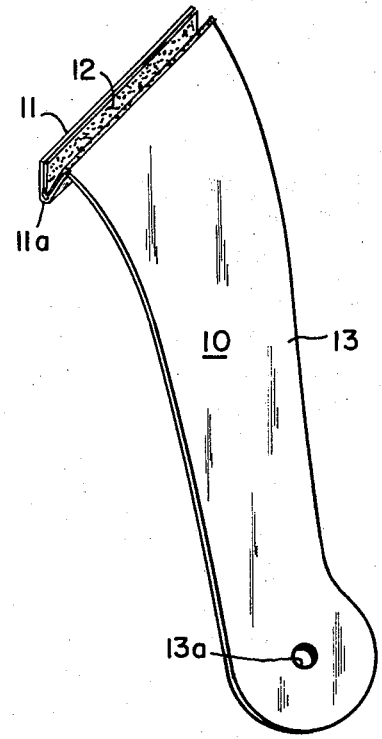
FIG. 3 is a side perspective view on the scale of FIGS. 1 and 2 and taken from the underside of the tool to show the shape and construction of its operating head.
Figure 4:
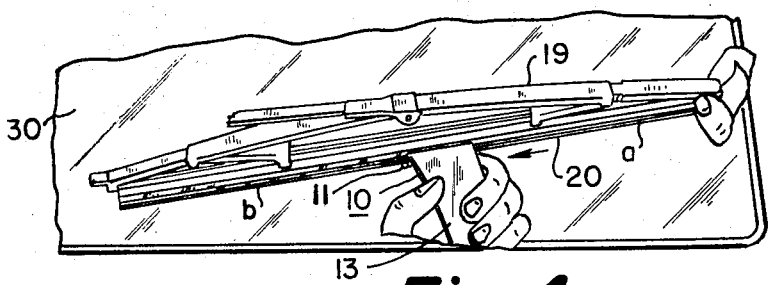
FIG. 4 is a somewhat schematic view illustrating the operating usage of the tool or device of FIGS. 1 and 3 as applied to the cleaning of a representative rubberlike wiper blade; this view is on a reduced scale with respect to FIGS. 1 to 3.

The operation of the device 10 is particularly illustrated in FIGS. 4 and 5. In FIG. 4, 20 represents a typical rubberlike wiper blade in position over a glass windshield 30 of an automobile. Portion 20a thereof represents an immediate wiping edge portion which normally will engage the surface of the windshield 30. This figure illustrates the tool 10 being pulled along the immediate wiping edge 20a and opposed adjacent side face portions 20b and 20c of the blade 20 (see also FIG. 5). In FIG. 4, a shows a portion of the blade 20 from which the film has been removed and b shows the dirty portion on which a film or coating has been deposited.

With reference to FIG. 5, it is highly important to construct and employ the head 11 in such a manner as to support the blade 20 in an uncreased or bent-over shape by providing an angular relation between the opposed side walls of the V-shaped recessed operating head 11, such that an immediate wiping edge 20a of the blade 20 will be maintained in supported engagement with the abrasive material 12 adjacent to or within the rounded connecting apex 11a of the head. Although as demonstrated in FIG. 6, wiper blades may be of slightly different contour, as indicated by the blade 20' that is utilized on a jeep, it has been determined that the operating head 11 will be effective for any presently known type of wiper blade being used by an automobile manufacturer. A tool or device 10 can be carried in the glove compartment of a car for ready availability as a safety item to always assure a clean windshield.

I claim:

1. In a tool of the character shown and described for reconditioning a rubberlike wiper blade by relative movement of the tool in a supporting relation along a wiping edge portion and opposed adjacent side faces of the blade, a relatively rigid operating head and an outwardly extending handle having an integral connection with said operating head, said operating head having a V-shape, an abrasive surface of relatively fine gritlike texture along the inside of the V-shape of said operating head, the V-shape of said operating head being defined by a pair of opposed side walls that converge in an offset relation with respect to said handle into a connecting apex to slidably engage the opposed adjacent side faces of the blade and support and maintain the wiping edge portion in slidable engagement along its length with the grit of said abrasive surface adjacent and connecting apex during the relative movement of the tool along the blade, said handle having a pair of opposed planar wide side faces that are integrally connected to and along an inner longitudinal side of said operating head, said side walls of said head converging in an outwardly offset relation with respect to said wide side faces of said handle, and said abrasive surface having a grit size within a range of about 100 to 500 in fineness.

2. In a tool as defined in claim 1, each of said opposed side walls defining an angle of about 10° with respect to the vertical.

3. In a tool of the character shown and described for reconditioning a rubberlike wiper blade by relative movement along its wiping edge portion and opposed adjacent side faces thereof, a relatively rigid operating head and an outwardly extending handle having a backwardly sweeping angular relation and an integral connection with an inner longitudinal side of said operating head, said operating head having a V-shape extending along said integral connection with said handle and defined by a pair of opposed substantially planar downwardly-inwardly sloped side walls that converge in an offset relation with respect to said handle into a connecting apex to slidably engage and support the opposed adjacent side faces of the blade, said connecting apex having a cross-extending relation with respect to said handle, and an abrasive of a relatively fine grit texture secured along the inside of the V-shape of said operating head for frictional abutting engagement with the wiping edge portion, and adjacent side faces of a wiper blade.

4. In a tool as defined in claim 3, said handle having a backwardly sweeping angular relation with an inner longitudinal side of said operating head and also having relatively planar opposed wide side faces that are integrally connected to an upper edge of an inner one of said pair of planar side walls of said operating head.

5. In a tool as defined in claim 3, said connecting apex being of rounded shape for smooth engagement with the wiping edge portion, and said side walls having an angular relation with respect to each other whereby they will slide along the adjacent side faces in an alignment balancing relation to maintain the blade in a supported substantially vertical alignment during movement of said operating head therealong.

6. In a tool as defined in claim 5, said abrasive having a grit size within a range of about 350 to 400 in fineness.

7. In a tool as defined in claim 3, said operating head and said handle being of metal construction, and said blade having smoothly curved narrow edge portions defining its shape and extending from said operating head in an off-perpendicular angular direction with respect thereto.

8. In a tool as defined in claim 3, said handle being of relatively flat straplike metal construction and having an eyelet in its back end portion for mounting it when not in use.

9. In a tool as defined in claim 3, said abrasive having a grit fineness with a range of 300 to 500 and being in the form of a strip secured along inner faces of said pair of opposed planar side walls and along the inside of said connecting apex of said head.

10. In a tool as defined in claim 3, said abrasive being in the form of a relatively strong fabriclike material having a pressure-sensitive adhesive on the outer side thereof for securing it along inner faces of said pair of opposed side walls of said operating head and along an inner face of said connecting apex, and said abrasive material having a grit size on its inner side within a range of about 350 to 400 in fineness.

* * * * *